United States Patent [19]

Pasco

[11] Patent Number: 5,151,826
[45] Date of Patent: Sep. 29, 1992

[54] FRESNEL LENS

[75] Inventor: Ian K. Pasco, Bracknell, Great Britain

[73] Assignee: Combined Optical Industries Limited, Slough, United Kingdom

[21] Appl. No.: 668,814

[22] Filed: Mar. 8, 1991

Related U.S. Application Data

[63] Continuation of Ser. No. 439,641, Nov. 20, 1989, abandoned.

[30] Foreign Application Priority Data

Oct. 16, 1989 [GB] United Kingdom ............... 8923265

[51] Int. Cl.$^5$ .............................................. G02B 3/08
[52] U.S. Cl. ................................... 359/742; 359/565; 359/571
[58] Field of Search ............... 350/452, 432; 359/565, 359/571, 708, 742

[56] References Cited

U.S. PATENT DOCUMENTS 4,637,697 1/1987 Freeman .......................... 350/452
4,787,722 11/1988 Claytor .......................... 350/452

FOREIGN PATENT DOCUMENTS 2173013 10/1986 United Kingdom .

Primary Examiner—Paul M. Dzierzynski
Attorney, Agent, or Firm—Oblon, Spivak, McClelland, Maier & Neustadt

[57] ABSTRACT

A fresnel lens in which each of the facets is so dimensioned and configured that the distance between the facet and a focal point of the lens is $(n+k)\lambda$ where n is an integer, $\lambda$ is the wavelength of the radiation passing through the lens, and k is a fraction between 0 and 1 which is substantially constant for any facet over the entire face of the lens. Preferably the lens comprises a plurality of zones, each comprising a number of facets, the integer n being constant for each facet of each said zone, but being different for facets of different zones.

7 Claims, 3 Drawing Sheets

FRESNEL LENS

This application is a continuation of application Ser. No. 07/439,641, filed Nov. 20, 1989 now abandoned.

The present invention relates to a fresnel lens. More particularly, but not exclusively, it relates to a fresnel lens suitable for use with infra-red radiation, especially in intruder detectors.

The use of polyethylene fresnel lenses in intruder detectors is known. For example, British patent no. 2124363 describes an intruder detector comprising a sensor and imaging system for focussing energy from monitored zones onto the sensor. The imaging system is described as being preferably a flat segmented fresnel lens constructed from polyethylene.

Polyethylene has some advantages as a lens material, especially for infra-red radiation. It is comparatively easily moulded and is a relatively robust material. However, it does suffer from certain disadvantages in that a relatively thick lens of polyethylene will absorb a disproportionate amount of infra-red radiation thereby reducing the efficiency of the intruder detection system. It is for this reason that fresnel lenses are preferred, since they are comparatively thin across their width which is not the case with a standard biconvex converging lens. Another advantage of the relatively flat fresnel lenses is that the moulding process is made easier and quicker due to their substantially planar thin cross-section.

Another problem with lenses of this type is that a beam of light (which term is intended herein to cover visible light and any electromagnetic radiation, including infra-red radiation) which arrives at the lens as a substantially parallel beam is converged by the lens to a detector located at a focal point which is spaced from the lens by a distance approximately equal to the focal length of the lens. However, the distance between the lens and the focal point will be different in respect of light arriving at one portion of the lens when compared to that for light arriving at a different portion of the lens. For example, in a concentric fresnel lens, the focal point is generally on a central axis normal to the plane of the lens. Light travelling between the focal point and this point of the lens has a shorter path length than does light arriving and being focussed at an outer portion of the lens. Due to diffraction effects caused by the grooves of the lens, the different path lengths may give rise to destructive interference at the detector, whereby the efficiency of the lens and the system including it is further impaired.

It is an object of the present invention to provide a lens which overcomes the above disadvantages and in which the light received by the detector is substantially in phase, or at least the light is phase optimised.

According to the present invention there is provided a fresnel lens in which each of the facets is so dimensioned and configured that the distance between the facet and a focal point of the lens is $(n+k)\lambda$ where n is an integer, $\lambda$ is the wavelength of the radiation passing through the lens, and k is a fraction between 0 and 1 which is substantially constant for any facet over the entire face of the lens.

Preferably the lens comprises a plurality of zones, each comprising a number of facets, the integer n being constant for each facet of each said zone, but being different for facets of different zones.

The facets may be disposed on the face of the lens nearest the said focal point. This arrangement is preferred for the sake of efficiency.

Each facet may be configured as an aspheric curve.

The lens may be generally of substantially uniform thickness, in which case the width of facets may change across the lens.

The lens may be moulded or otherwise formed from high density polyethylene.

In this case, the lens may be thickest at a substantially central feed point and overall may decrease in thickness towards its edges.

The radiation may be infra-red radiation, for example in the wavelength range of 7 to 14 $\mu$m.

The lens may form part of an intruder detector or an environment control system.

The lens is preferably a collimating lens, and a radiation detector may be located substantially at the focal point, although other distances from the lens may be appropriate.

The intruder detector lens may comprise a plurality of portions of different fresnel lenses, each as described above and adapted to focus radiation to a single detector, which detector may have one or more detector elements.

According to another aspect of the invention there is provided an intruder detector comprising a lens as described above, and a detector for radiation.

An embodiment of the present invention will now be more particularly described by way of example and with reference to the accompanying drawings, in which.

A preferred form of lens embodying the invention is substantially planar and is provided with a plurality of fresnel facets on the face directed toward a detector for the radiation focussed by the lens. In fact, the lens is not entirely planar since it is preferred for ease of moulding that the lens is very slightly thicker at its central point than it is at the edges. For example, the center may be a maximum of 0.5 mm thick and a maximum of 0.45 mm thick at the edges. Again, it is preferred that the additional thickness at the center is taken up on the non-faceted side of the lens, which, in use, faces outwardly. The lens could be used with facets facing outwardly, on the side remote from the detector, but this will lead to a certain loss of light and will also make the exterior surface of the lens more difficult to clean.

The fresnel grooves of the lens are of substantially even depth, with a minimum lens thickness of 0.25 mm under the grooves. With the even depth of the grooves, the spacing between them becomes narrower towards the edge of the lens. This can be seen in the Figure.

The form of each facet is an aspheric curve determined by the formula:

$$z = \frac{(y^2/R)}{(1 + (1 - py^2/R^2)^{\frac{1}{2}})} + A_4 y^4 + A_6 y^6 + A_8 y^8 \ldots + A_N y^N$$

where
z is the height of curve,
y is the radial distance from the axis,
p is the eccentricity of the base curve, R is the radius at the apex of the aspheric surface, and $A_4, A_6, A_8 \ldots A_N$ are correction coefficients.

These coefficients may be used for fine curve adjustment to provide the required phase optimalisation. In addition, adjustment of the highest appropriate coefficient can also be used to delay the onset of offense against the critical angle at the outer edge of the lens. This can provide one or two extra facets over and above that which can be achieved using a pure conic equation.

Figure 1:
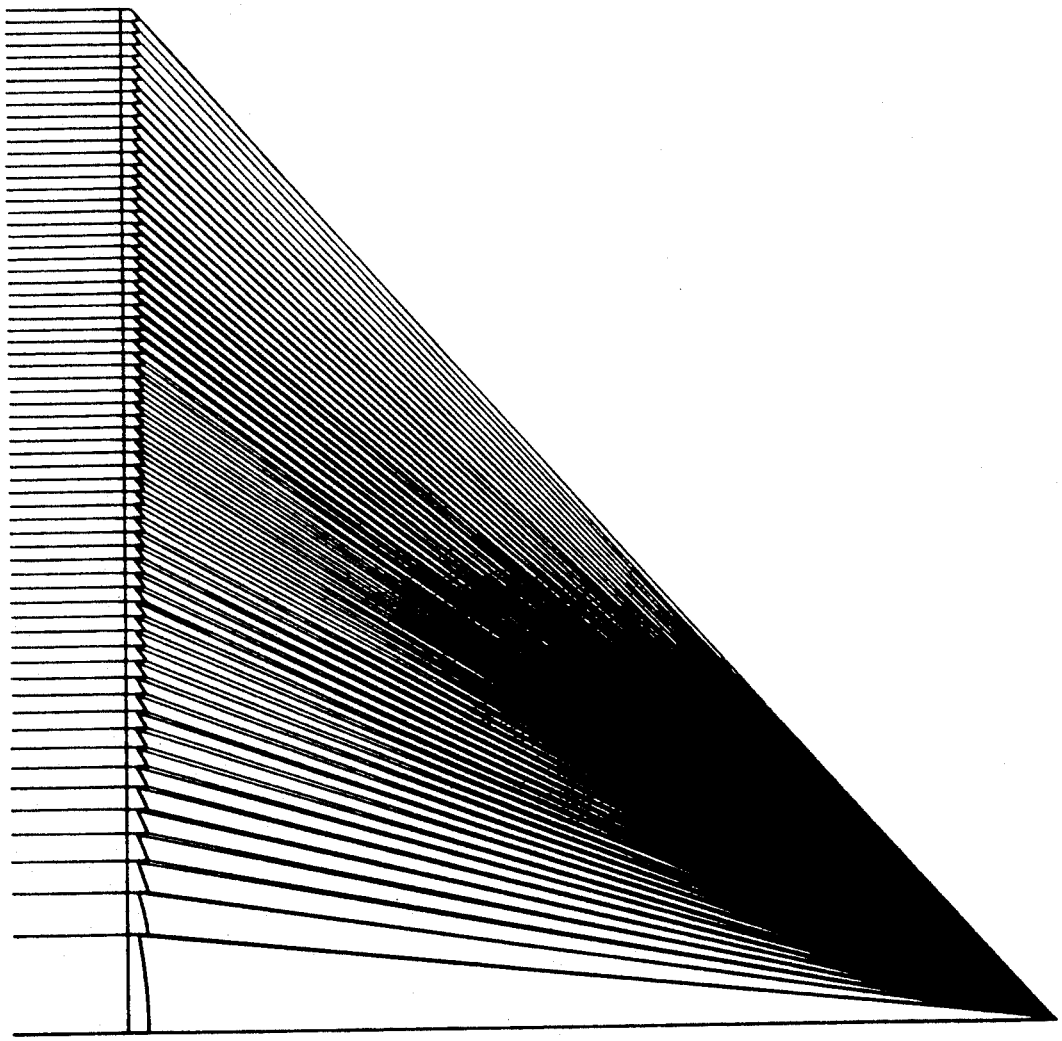
FIG. 1 is a light ray trace for half of a fresnel lens.
Figure 2:
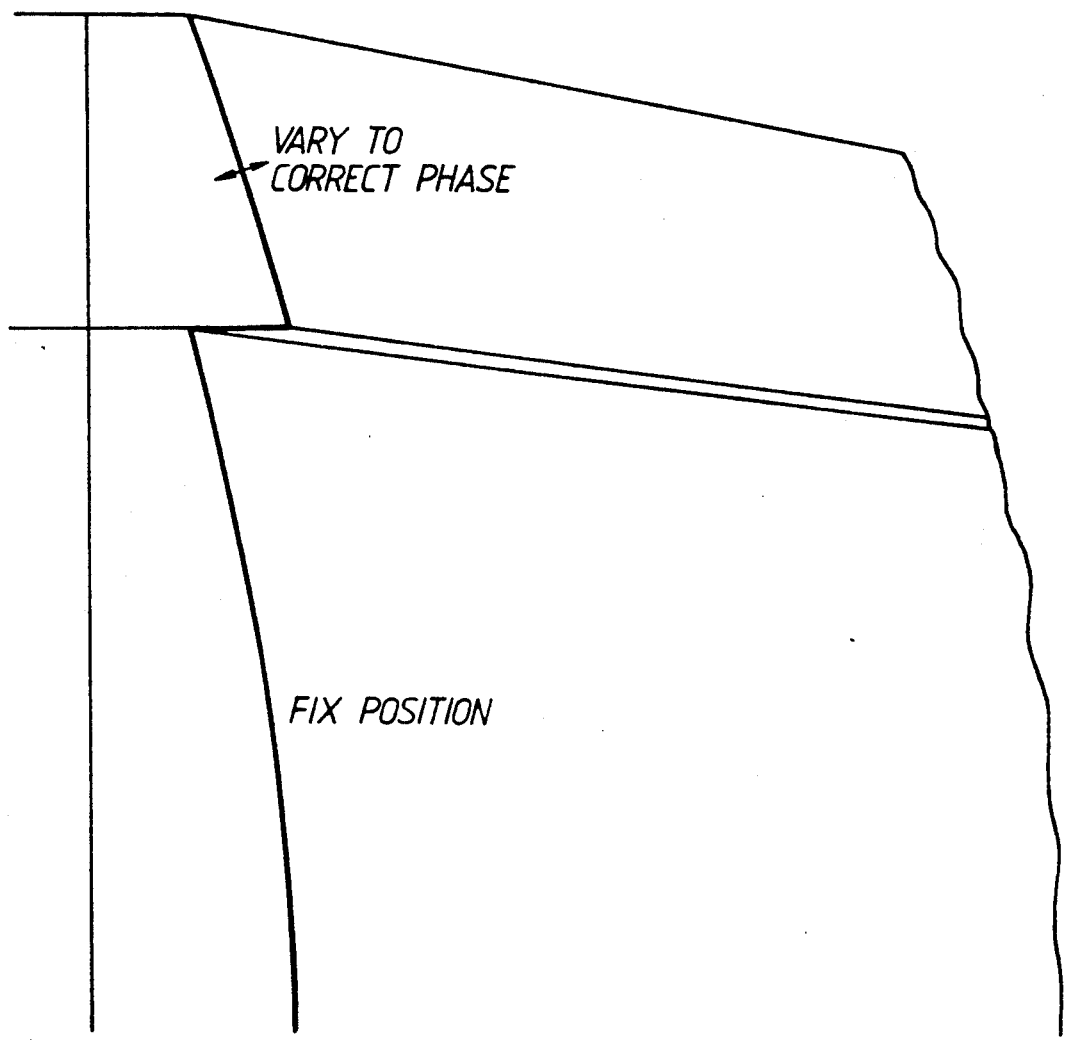
FIG. 2 is a schematic view of facets of a lens drawn to a larger scale.

In designing the lens, assuming that it is a concentric fresnel lens, each facet is given a thickness and aspheric curvature so that light passing through that facet and received at the detector will be in phase with light passing through the immediately preceding adjacent facet. This can be seen from FIG. 2.

Figure 3:
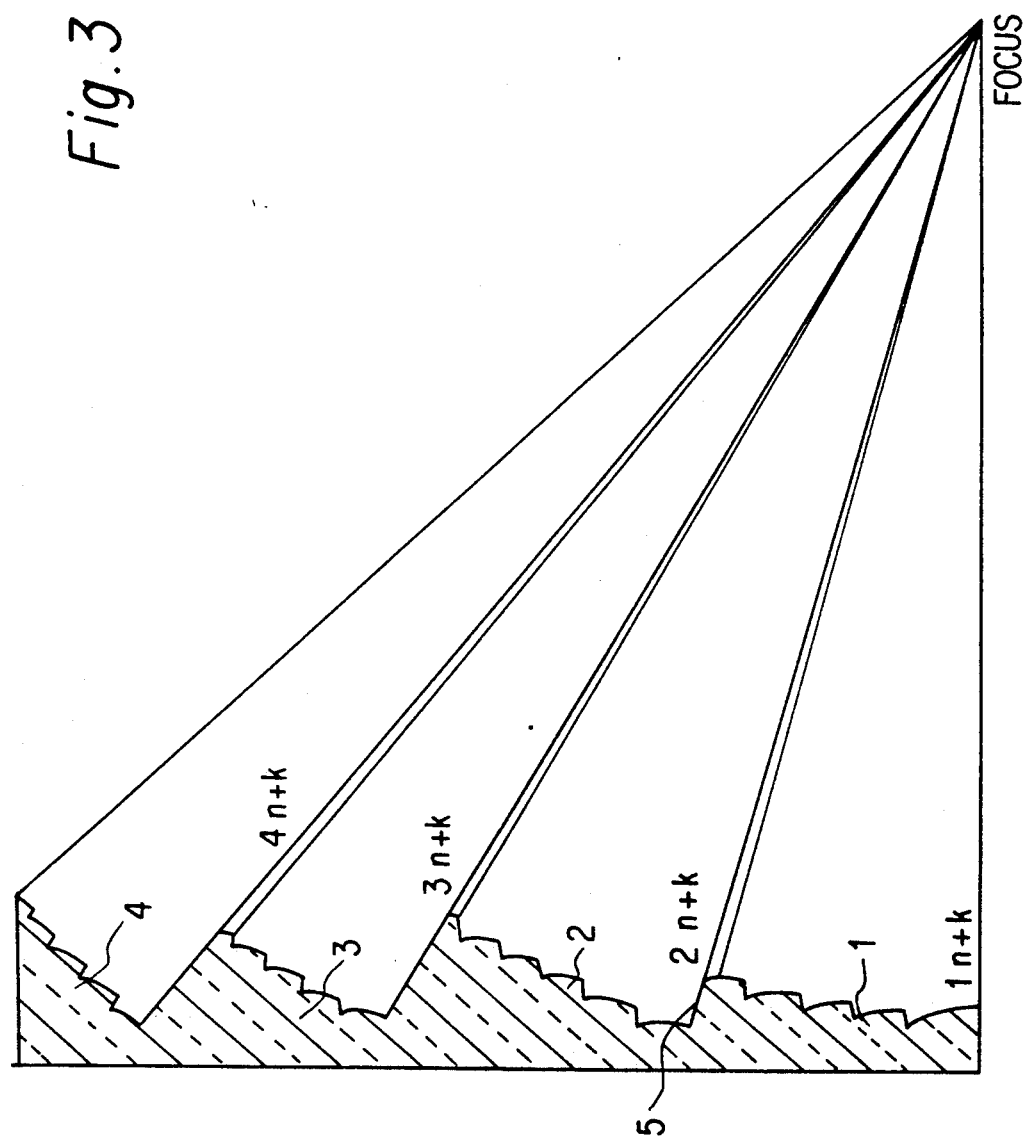
FIG. 3 is an enlarged, schematic cross sectional view of a lens incorporating features of the present invention.

As each facet is phase correlated with the preceding facet, the lens thickness will change. In order to maintain the overall thinness of the lens, and with reference to FIG. 3 the surface of the lens is divided into zones such as those designated by the numerals 1, 2, 3 and 4, each zone having a number of facets, and with the light path between that zone and the detector increasing from one zone to the immediately adjacent zone by an integral number of wavelengths of the light passing through the lens. When the change in lens thickness is about to exceed 0.1 mm as at 5 in FIG. 3, the value of n will be changed, preferably by a unitary integral value, in order to control the thickness of the lens. This ensures that all light received in the detector is substantially in phase.

A preferred material for the lens is polyethylene, although other materials may be used. In an intruder detector lens, it is generally desirable to be able to focus on several zones in the area being scanned. To this end, the entire lens is preferably an assembly of sections of individual fresnels. These are generally of rectangular shape but the exact form of each section is adapted to focus radiation from a different area of the space being scanned. Once the desired form of the composite lens has been determined, the entire lens may be integrally moulded from polyethylene.

What I claim is:

1. A fresnel lens comprising a plate having a plurality of zones, a plurality of facets in each zone so dimensioned and configured that the distance between a face of the lens for each facet and a focal point of the lens on the same side thereof as said face is $(n+k)\lambda$ where n is an integer, $\lambda$ is the wavelength of radiation passing through the lens and k is a fraction between 0 and 1 which is substantially constant for every facet across the entire face of the lens, the integer n being constant for all the facets of each zone, with the integer n being different for the facets of different zones, respectively, whereby the radiations from all of said zones arrives at said focal point substantially in phase.

2. A fresnel lens according to claim 1, wherein the facets are disposed on the face of the lens nearest the said focal point.

3. A fresnel lens according to claim 1, wherein each facet is configured as a aspheric curve.

4. A fresnel lens according to claim 1, wherein the lens is generally of substantially uniform thickness, and the width of a facet is different at different points across the lens.

5. A fresnel lens according to claim 1, wherein the lens is moulded from high density polyethylene, and the lens is thickest at a substantially central feed point and overall decrease in thickness towards its edges.

6. A fresnel lens according to claim 1, constructed and arranged for use with infra-red radiation in the wavelength range of 7 to 14 $\mu$m.

7. A fresnel lens according to claim 1 wherein the value of n for each successive zone is changed by a unitary integral value.

* * * * *